United States Patent [19]

Maennle

[11] Patent Number: 5,506,502
[45] Date of Patent: Apr. 9, 1996

[54] ROTARY ANGLE ENCODER HAVING A ROTATING TRANSDUCER SHAFT COUPLED TO A LINEAR SENSOR COIL

[75] Inventor: Erik Maennle, Oberkirch, Germany

[73] Assignee: Robert Bosch GmbH, Stuttgart, Germany

[21] Appl. No.: 296,631

[22] Filed: Aug. 26, 1994

[30] Foreign Application Priority Data

Sep. 20, 1993 [DE] Germany .......................... 43 31 909.2

[51] Int. Cl.⁶ .............................. G01B 7/14; G01B 7/30; G01R 33/02
[52] U.S. Cl. ................. 324/207.25; 324/207.16; 324/207.22
[58] Field of Search .................... 324/173, 174, 324/207.25, 207.13, 207.22, 207.24, 207.15, 207.16, 207.18, 207.19; 74/22 R, 25, 84

[56] References Cited

U.S. PATENT DOCUMENTS

| 3,576,302 | 4/1977 | Palfreyman . |
| 4,752,732 | 6/1988 | Van Schoiack et al. . |
| 4,856,477 | 8/1989 | Hanaoka et al. . |
| 4,906,924 | 3/1990 | Zannis ........................ 324/207.24 |
| 5,133,321 | 7/1992 | Hering et al. . |

FOREIGN PATENT DOCUMENTS

| 0393974 | 10/1990 | European Pat. Off. . |
| 3411393 | 10/1985 | Germany . |
| 3411455 | 10/1985 | Germany . |
| 3411456 | 10/1985 | Germany . |
| 1260517 | 1/1972 | United Kingdom . |
| 2216268 | 10/1989 | United Kingdom . |
| WO89/07706 | 8/1989 | WIPO . |

OTHER PUBLICATIONS

Gerhard Kolberg, Elektronische Motorsteuerung für Kraftfahrzeuge, (Electronic Engine–Control System for Motor Vehicles), pp. 129–133, MTZ Motortechnische Zeitschrift 46 (1985) 4 (no translation).

Primary Examiner—Walter E. Snow
Attorney, Agent, or Firm—Edwin E. Greigg; Ronald E. Greigg

[57] ABSTRACT

The invention relates to a rotary angle encoder for motor vehicle applications for pedal value transducers and clutch actuators. The rotary angle encoder includes a rotatably having a rotatably supported transducer shaft, which is coupled to a movable device so that it can be rotated thereby in accordance with the position thereof, and which cooperates with a rotary angle sensor that furnishes an electrical rotary angle signal. The rotary angle sensor includes at least one linear sensor coil, disposed stationary relative to the rotational motion of the transducer shaft and has a coil core retained displaceably in it. The coil core is displaceable by the transducer shaft via a crank mechanism, and the coil axis corresponding to the direction of displacement of the coil core in the sensor coil is disposed perpendicular to the pivot axis of the transducer shaft.

20 Claims, 3 Drawing Sheets

ROTARY ANGLE ENCODER HAVING A ROTATING TRANSDUCER SHAFT COUPLED TO A LINEAR SENSOR COIL

BACKGROUND OF THE INVENTION

The invention relates to a rotary angle encoder for monitor pedal value transducers and clutch actuators for vehicular applications.

In a known pedal value transducer (German Patent Application DE 34 11 393 A1), a rotary angle sensor is provided for detecting the swiveled position of the pedal coupled to it; it cooperates with a pedal-actuated transducer shaft rotatably supported in a housing. A wiper ring potentiometer that furnishes an electrical rotary angle signal corresponding to the pedal position is provided as the rotary angle sensor.

Although current demands can for the most part be met by such pedal value transducers that use potentiometer sensors to detect the rotary angle, nevertheless the low reliability of potentiometers is disadvantageous for certain control tasks.

As robust and economical travel transducers to meet accuracy demands that are usual for large-scale mass production, plunger armature transducers have long been known, that is, coils with a core or armature displaceable in them in accordance with the travel to be detected, and are used in the motor vehicle field, for instance in controlling headlight beam angles.

The variation in inductivity of a coil is evaluated by the inward movement of a plunger of a ferromagnetic core. To linearize such a characteristic curve of such a sensor, a plurality of series-connected coil chambers with a different number of turns is used.

Other contactless sensors operating on magnetoresistive or inductive principles have high sensitivity to many interference variables and little deviation in the useful signal. Compensatory designs to overcome these disadvantages involve great major effort and expense, so that such sensors are not suitable for large-scale mass production.

OBJECT AND SUMMARY OF THE INVENTION

The object of the present invention is to furnish a rotary angle encoder of the type referred to at the outset, which with a rotary angle can be reliably detected with an economical, space-saving design.

In a rotary angle encoder of the type referred to at the outset, this object is attained in accordance with the invention as set forth hereinafter.

By the disposition according to the invention of the sensor coil with a crank mechanism cooperating with the sensor coil, a compact rotary angle encoder with a space-saving rotary angle sensor is advantageously created that is sufficiently and advantageously sturdy and accurate enough to be used even for safety-critical applications in motor vehicles.

Accordingly, by the selected geometrical disposition, an extremely space-saving, sufficiently accurate and economical use of a contactless linear sensor coil as a rotary angle sensor is advantageously made possible.

Advantageous further features of and improvements to the rotary angle encoder disclosed herein are possible with the provisions recited hereinafter.

To compensate for the nonlinear transmission characteristic of the crank mechanism between the coil core and the transducer shaft, further advantageous features are provided.

It is an object to increase the reliability of the rotary angle encoder according to the invention. As a result, the mechanical and electrical redundancy of the rotary angle encoder is advantageously assured without substantially increasing the installed size.

The further features of the invention enable not only an especially simple, easily installed design of the rotary angle encoder according to the invention but advantageously also enable the use of brittle materials such as a ferrite that nevertheless are advantageous in terms of both their function and their cost.

Another object is to provide an especially advantageous compact arrangement. It is especially advantageous that on the one hand the rotary angle sensor per se forms a component unit that can be tested by itself, and on the other hand the complete rotary angle encoder can be calibrated to compensate for any production tolerances.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
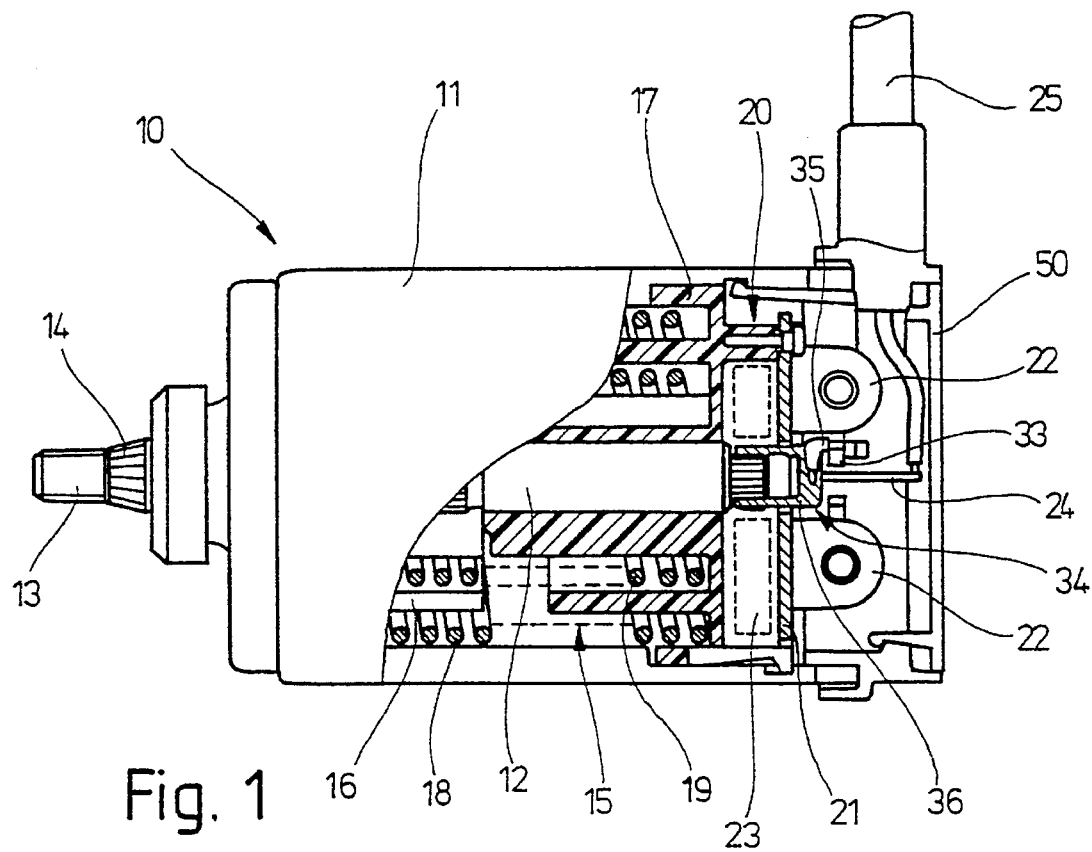
FIG. 1 shows a schematic plan view of a rotary angle encoder, shown partly in section.

In the various figures of the drawing, components corresponding to one another are provided with the same reference numerals.

In FIG. 1, a rotary angle encoder 10 is shown with a housing 11 in which a transducer shaft 12 is rotatably supported. On its end protruding from the housing 11, the transducer shaft 12 carries fastening means 13, 14 for a rotary or pivoting device, not shown, by which it is rotatable in accordance with the rotational or pivoted position of the shaft. For instance, the rotary angle encoder 10 may be connected in a suitable way to a pedal of a motor vehicle, so that the transducer shaft 12 is rotated in the housing 11 in accordance with the pedal position.

In the housing 11, a restoring spring assembly 15 disposed coaxially with the transducer shaft 12 is provided; it has a first spring cage 16, joined to the transducer shaft 12 in a manner fixed against relative rotation, and a second spring cage 17, joined to the housing 11 in a manner fixed against relative rotation. Two parallel-acting restoring springs 18, 19 are received in the spring cages 16, 17 and upon rotation of the transducer shaft 12 generate a reactional force that is fed back to the rotary or pivoting device.

A rotary angle sensor 20 is coupled to the other end of the transducer shaft 12, that is, the end located in the housing 11; this sensor includes a carrier plate 21 secured for instance to the spring cage 17 joined to the housing 11 in a manner secured against relative rotation. One or more, preferably two, sensor coil assemblies 22 are provided on the side of the carrier plate 21 remote from the restoring spring assembly 15, while on the other side of the carrier plate 21 evaluation electronic components 23 of the rotary angle sensor 20 are disposed. Via connection lugs 24, which extend through the carrier plate 21, the evaluation electronic components 23 are connected to an electric line 25, which is extended in sealed fashion out of the housing 11 and connected to an onboard vehicle electronics system, not shown.

Figure 2:
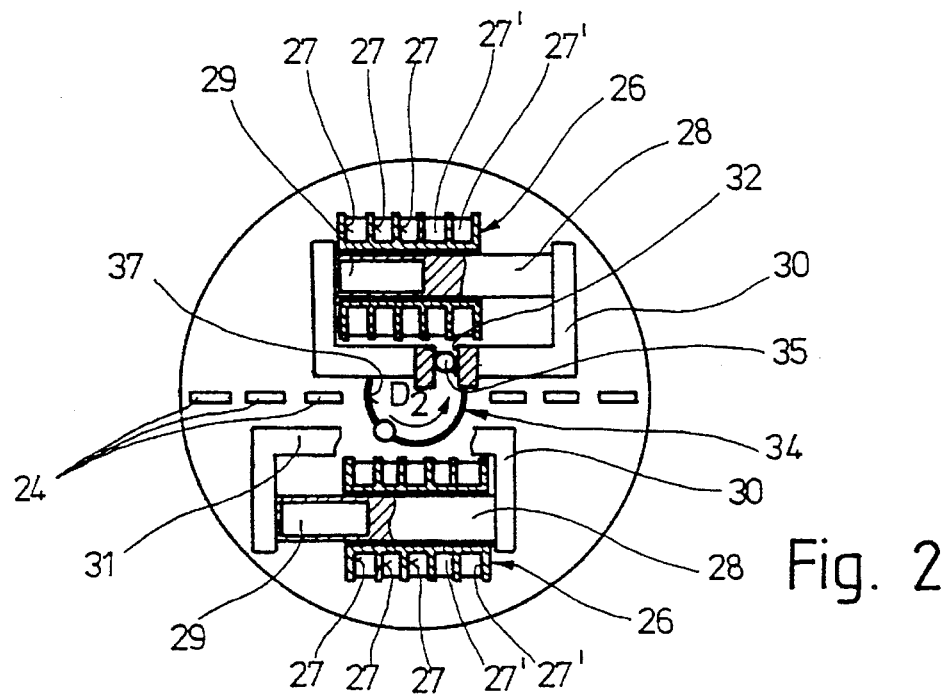
FIG. 2 is a plan view on the rotary angle sensor of the rotary angle encoder of FIG. 1.

As FIG. 2 shows, each of the preferably two sensor coil arrangements 22 has one sensor coil 26 with a number of coil chambers 27; the series-connected winding assemblies 27' disposed in these chambers have a different number of turns. A core carrier 28 disposed in the sensor coil 28 receives a coil core 29 that forms a movable plunger armature, which is of ferrite, for instance, and the core carrier 28 is preferably applied to it by spraying during the injection molding process. On its two ends protruding from the sensor coil 26, the core carrier 28 is retained by a guide 30 that fits around the sensor coil 26 approximately like a letter C and into which coil it can be snapped in place.

On its bridge segment 31 disposed essentially parallel to the sensor coil 26, the core carrier guide 30 has a hooplike recess 32 open toward the carrier plate 21, which adjacent the carrier plate 21 is defined by two protrusions 33 that increase the length of the recess 32 essentially at right angles to the longitudinal axis of the sensor coil 26 and parallel to the carrier plate 21.

A crank 34 of a crank mechanism engages this recess 32 with one of two crank pins 35, which are disposed diametrically opposite one another, with respect to the axis of rotation of the crank, on a crank carrier 36, which by way of example is cup-shaped. The other crank pin 35 engages the corresponding recess 32 of the core carrier guide 30 of the other sensor coil arrangement 22. To enable transmitting the crank motion without play to the two core carrier guides 30, the crank pins 35 are received in prestressed fashion in their respective recesses 32. The prestressing is attained by suitable dimensioning of the recess 32 and crank pin 35. If an elastic, dimensionally stable, low-friction and low-wear material, such as plastic, is used for the bridge segment 31, then reliable play-free transmission of the rotary motion of the transducer shaft 12 to the linear motion of the coil core 29 is possible in a simple way.

Figure 3:
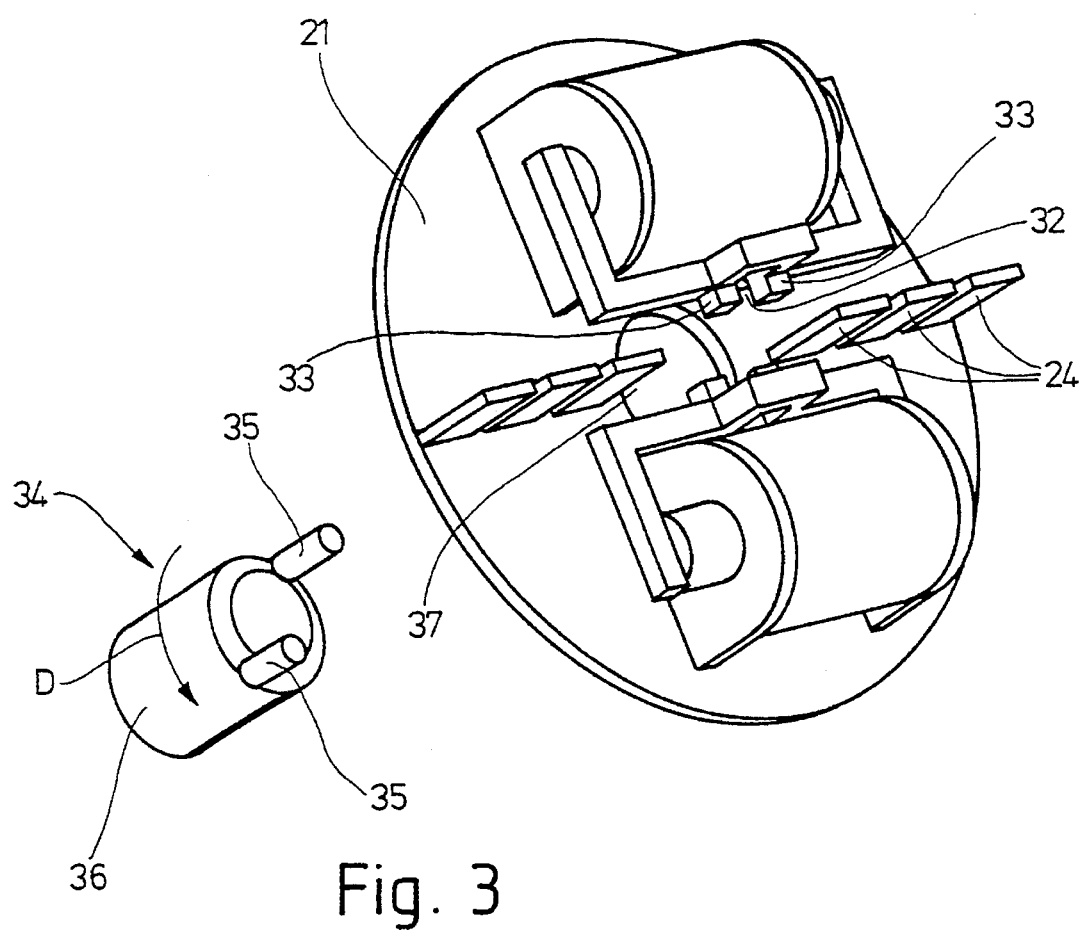
FIG. 3 is a schematic perspective view of the rotary angle sensor of FIG. 2 with an associated crank.

As FIG. 1 shows, the crank 34 is secured with its crank carrier 36 coaxially on the transducer shaft 12 and extends through a central opening 37 (see FIG. 3, for example) in the carrier plate 21.

As shown in FIG. 2, the core carriers 28 are preferably inserted into the sensor coils 26 in such a way that one coil core 29 is located in the sensor coil 26 in the position of repose of the rotary angle encoder 10, and upon a displacement of the core carrier guide 30 as a consequence of rotation of the transducer shaft 12 in the direction of the arrow D emerges from the sensor coil 26, while the other coil core 29 in the position of repose is located essentially outside its sensor coil 26 and upon displacement moves into it.

If the transducer shaft 12 is rotated by a suitable rotary or swivel device, then the coil cores 29 are displaced in the sensor coils 26, causing them to change their inductivity. The resultant nonlinear conversion of the rotary angle into the displacement travel of the coil core 29 by the crank 34 that cooperates with the core carrier guide 30 is compensated for by the different numbers of turns provided in the individual coil chambers 27 of the sensor coil 26.

Figures 4A, 4B:
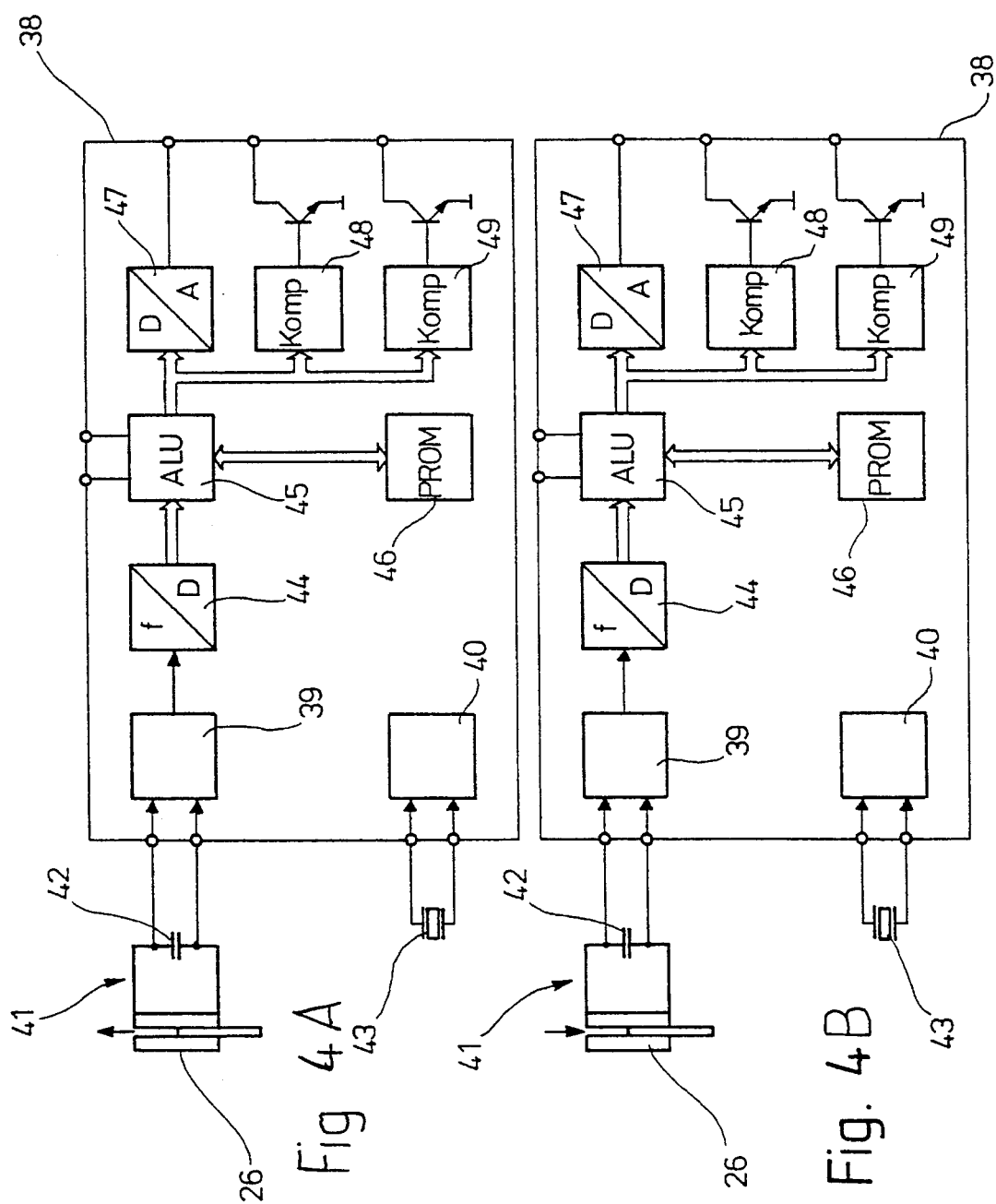
FIGS. 4a and 4b illustrate two separate schematic block circuit diagrams of the rotary angle sensor of FIG. 2.

The evaluation electronic components 23 disposed on the carrier plate 21 have one or more, preferably two, integrated circuits 38 shown in FIGS. 4a and 4b, corresponding to the number of coil arrangements provided, and each integrated circuit has one measurement oscillator and one reference oscillator 39 and 40, respectively. The input signal of the measurement oscillator 39 is furnished by a respective sensor oscillating circuit 41, which includes not only the sensor coil 26 but also a capacitor 42, while the reference oscillator 40 is connected to an oscillator quartz 43 or some other suitable vibration transducer.

The output signal of the measurement oscillator 39 is carried via a f/D converter 44 to an arithmetic and logic unit (ALU) 45, which is connected to a programmable read-only memory (PROM) 46. The output signal of the ALU 45 corresponding to the rotary angle detected is applied via a digital/analog converter 47 as a rotary angle signal, for instance a pedal value, to one output of the integrated circuit 38 and is additionally applied directly to two comparators 48, 49, which when a defined, predetermined rotary angle is attained furnish an output signal corresponding to that rotary angle, an example being a kick-down signal for an automatic transmission, or the like.

The use of the integrated evaluation electronic components 23 results in low-impedance output signals which are accordingly not vulnerable to interference.

Because of the space-saving, compact disposition of the sensor coil arrangements 22 on the carrier plate 21, which at the same time carries the integrating evaluation electronics, the rotary angle sensor 20 forms a functional component unit that can also be fully tested separately. Calibration of the rotary angle sensor 20 enables economical compensation for any individual tolerances and with the circuitry concept described for the evaluation electronics 23 enables economical manufacture.

The rotary angle encoder 10 according to the invention, which can be used as a pedal value transducer, for instance, is fully testable and can be fully tried out, since external factors such as cable harness impedances of the vehicle and the like then cannot be involved as interfering variables.

Once the rotary angle sensor 20 is installed in the rotary angle encoder 10, calibration for offset and slope can be done via a serial interface and EEPROM. After that, the housing 11 of the rotary angle encoder 10 can be closed in a manner secure against manipulation, for instance with an internally lockable cap 50.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A rotary angle encoder for motor vehicle applications comprising a housing, a transducer shaft (12) in said housing, said transducer shaft is rotatably supported about a pivot axis and is coupled to a movable device such that the transducer shaft can be rotated thereby in accordance with a rotational position thereof, and which cooperates with a rotary angle sensor (20) that furnishes an electrical rotary angle signal, the rotary angle sensor includes at least one linear sensor coil (26), disposed stationary relative to the rotational motion of the transducer shaft (12) and each having a coil core (29) retained displaceably in said sensor, the coil core (29) is displaceable by the transducer shaft (12) via a crank mechanism (34), a coil axis corresponding to a direction of displacement of the coil core (29) in the at least one sensor coil (26) is disposed transversely, substantially perpendicular to a pivot axis of the transducer shaft (12), and the coil core (29) is displaceable by means of a core carrier guide (30) that has a bridge segment (31) extending substantially parallel to the at least one sensor coil (26), and a power takeoff side of the crank mechanism (34) includes pins of the crank mechanism (34), which in a position of repose, engages the bridge segment (31) approximately in a region of a longitudinal center of the at least one sensor coil 26.

2. A rotary angle encoder as defined by claim 1 in which the coil axis is spaced apart from the pivot axis of the transducer shaft (12).

3. A rotary angle encoder as defined by claim 1, in which a crank pin (35) forms a power takeoff side (35) of the crank mechanism (34), extends parallel to the pivot axis of the transducer shaft (12), and engages a corresponding recess (32) of the core carrier guide (30) in prestressed fashion.

4. A rotary angle encoder as defined by claim 1, in which the sensor coil (26) includes a plurality of coil chambers (27) with winding assemblies (27'), which are connected in series with one another.

5. A rotary angle encoder as defined by claim 1, in which two sensor coils (26) are provided, said two sensor coils are located diametrically opposite one another with respect to the pivot axis of the transducer shaft (12).

6. A rotary angle encoder for motor vehicle applications comprising a housing, a transducer shaft (12) in said housing, said transducer shaft is rotatably supported about a pivot axis and is coupled to a movable device such that the transducer shaft can be rotated thereby in accordance with a rotational position thereof, and which cooperates with a rotary angle sensor (20) that furnishes an electrical rotary angle signal, the rotary angle sensor includes at least one linear sensor coil (26), disposed stationary relative to the rotational motion of the transducer shaft (12) and each having a coil core (29) retained displaceably in said sensor, the coil core (29) is displaceable by the transducer shaft (12) via a crank mechanism (34), a coil axis corresponding to a direction of displacement of the coil core (29) in the at least one sensor coil (26) is disposed transversely, substantially perpendicular to a pivot axis of the transducer shaft (12), and a crank pin (35) forms a power takeoff side of the crank mechanism (34), extends parallel to the pivot axis of the transducer shaft (13), and engages a corresponding recess (32) of a core carrier guide (30) in a prestressed fashion.

7. A rotary angle encoder as defined by claim 6, in which the coil axis is spaced apart from the pivot axis of the transducer shaft (12).

8. A rotary angle encoder as defined by claim 6, in which the sensor coil (26) includes a plurality of coil chambers (27) with winding assemblies (27'), which are connected in series with one another.

9. A rotary angle encoder as defined by claim 6, in which two sensor coils (26) are provided, said two sensor coils are located diametrically opposite one another with respect to the pivot axis of the transducer shaft (12).

10. A rotary angle encoder for motor vehicle applications comprising a housing, a transducer shaft (12) in said housing, said transducer shaft is rotatably supported about a pivot axis and is coupled to a movable device such that the transducer shaft can be rotated thereby in accordance with a rotational position thereof, and which cooperates with a rotary angle sensor (20) that furnishes an electrical rotary angle signal, the rotary angle sensor includes at least one linear sensor coil (26), disposed stationary relative to the rotational motion of the transducer shaft (12) and each having a coil core (29) retained displaceably in said sensor, the coil core (29) is displaceable by the transducer shaft (12) via a crank mechanism (34), a coil axis corresponding to a direction of displacement of the coil core (29) in the at least one sensor coil (26) is disposed transversely, substantially perpendicular to a pivot axis of the transducer shaft (12), and the at least one sensor coil (26) includes a plurality of coil chambers (27) with winding assemblies (27'), which are connected in series with one another and have different numbers of coil turns.

11. A rotary angle encoder as defined by claim 10, in which the coil axis is spaced apart from the pivot axis of the transducer shaft (12).

12. A rotary angle encoder as defined by claim 10, in which two sensor coils (26) are provided, said two sensor coils are located diametrically opposite one another with respect to the pivot axis of the transducer shaft (12).

13. A rotary angle encoder as defined by claim 10, in which the core carrier (28) is snapped into the core carrier guide (30).

14. A rotary angle encoder for motor vehicle applications comprising a housing, a transducer shaft (12) in said housing, said transducer shaft is rotatably supported about a pivot axis and is coupled to a movable device such that the transducer shaft can be rotated thereby in accordance with a rotational position thereof, and which cooperates with a rotary angle sensor (20) that furnishes an electrical rotary angle signal, the rotary angle sensor includes at least two linear sensor coils (26), said two sensor coils are located diametrically opposite one another with respect to the pivot axis of the transducer shaft (12) and disposed stationary relative to the rotational motion of the transducer shaft (12) and each includes a coil core (29) retained displaceably in said sensor, the coil core (29) is displaceable by the transducer shaft (12) via a crank mechanism (34), and a coil axis corresponding to a direction of displacement of the coil core (29) in the two linear sensor coils (26) is disposed transversely, substantially perpendicular to a pivot axis of the transducer shaft (12).

15. A rotary angle encoder as defined by claim 14, in which the coil axis is spaced apart from the pivot axis of the transducer shaft (12).

16. A rotary angle encoder as defined by claim 14, in which the coil cores (29) are disposed in their sensor coils (26) in such a way that one coil core (29) moves into the sensor coil (26), while the other emerges, upon a displacement effected by the transducer shaft (12).

17. A rotary angle encoder for motor vehicle applications comprising a housing, a transducer shaft (12) in said housing, said transducer shaft is rotatably supported about a pivot axis and is coupled to a movable device such that the transducer shaft can be rotated thereby in accordance with a rotational position thereof, and which cooperates with a rotary angle sensor (20) that furnishes an electrical rotary angle signal, the rotary angle sensor includes at least two linear sensor coils (26), said two sensor coils are located diametrically opposite one another with respect to the pivot axis of the transducer shaft (12) and disposed stationary relative to the rotational motion of the transducer shaft (12) and each includes a coil core (29) retained displaceably in said sensor, the coil core (29) is displaceable by the transducer shaft (12) via a crank mechanism (34), a coil axis corresponding to a direction of displacement of the coil core (29) in the at least one sensor coil (26) is disposed transversely, substantially perpendicular to a pivot axis of the transducer shaft (12), and each coil core (29) is retained in a core carrier (28), which is secured to a core carrier guide (30).

18. A rotary angle encoder as defined by claim 17, in which coil core (29) is injection-coated with the core carrier (28) in the injection molding process.

19. A rotary angle encoder as defined by claim 18, in which the core carrier (28) is snapped into the core carrier guide (30).

20. A rotary angle encoder for motor vehicle applications comprising a housing, a transducer shaft (12) in said housing, said transducer shaft is rotatably supported about a pivot axis and is coupled to a movable device such that the transducer shaft can be rotated thereby in accordance with a rotational position thereof, and which cooperates with a rotary angle sensor (20) that furnishes an electrical rotary angle signal, the rotary angle sensor includes at least two linear sensor coils (26), said two sensor coils are located diametrically opposite one another with respect to the pivot axis of the transducer shaft (12) and disposed stationary relative to the rotational motion of the transducer shaft (12) and each includes a coil core (29) retained displaceably in said sensor, the coil core (29) is displaceable by the transducer shaft (12) via a crank mechanism (34), a coil axis corresponding to a direction of displacement of the coil core (29) in the at least one sensor coil (26) is disposed transversely, substantially perpendicular to a pivot axis of the transducer shaft (12), and the at least one sensor coil (26) is mounted on one side of a carrier plate (21) disposed perpendicular to the transducer shaft (12), and evaluation electronics (23) are disposed on another side, and joined to the at least one sensor coil (26) and furnish the rotary angle signal as an output.

* * * * *